C. B. ROWNTREE.
APPARATUS FOR AND METHOD OF TAKING TRICK AND ADVERTISING MOVING PICTURES.
APPLICATION FILED APR. 29, 1915.
1,227,075.
Patented May 22, 1917.
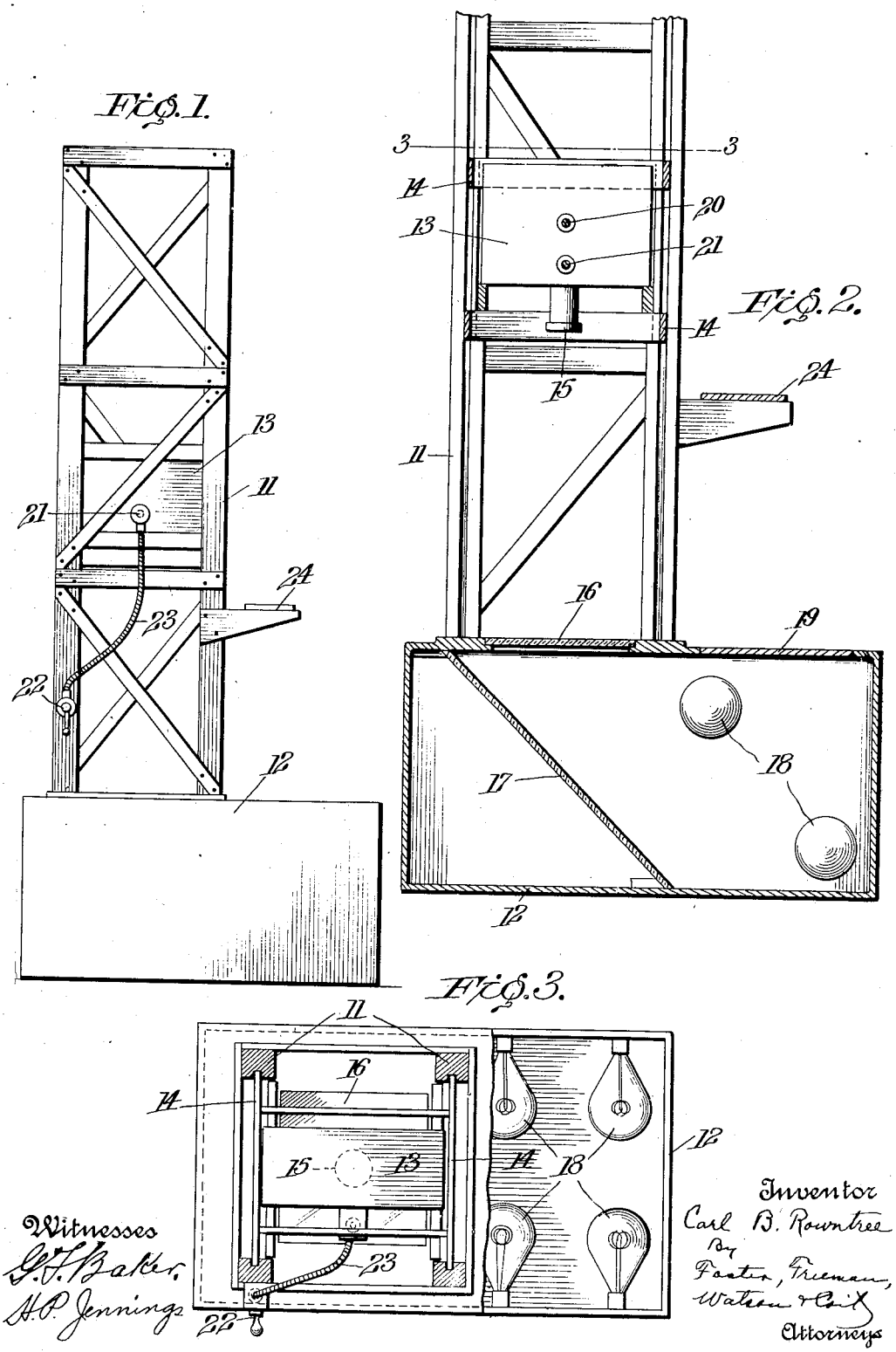

UNITED STATES PATENT OFFICE.

CARL B. ROWNTREE, OF ATLANTA, GEORGIA.

APPARATUS FOR AND METHOD OF TAKING TRICK AND ADVERTISING MOVING PICTURES.

1,227,075.  Specification of Letters Patent.  Patented May 22, 1917.

Application filed April 29, 1915. Serial No. 24,765.

*To all whom it may concern:*

Be it known that I, CARL B. ROWNTREE, a citizen of the United States, and resident of Atlanta, county of Fulton, State of Georgia, have invented certain new and useful Improvements in Apparatus for and Methods of Taking Trick and Advertising Moving Pictures, of which the following is a specification.

This invention relates to the taking of trick pictures which can be used in a projecting apparatus to give the effect on the screen of moving or changing objects. It may be employed in taking a series of pictures for instruction, for amusement, or for advertising purposes. According to my method the pictures are taken of the objects while in front of a light background from which rays of light pass toward the camera so that the objects appear in the picture in silhouette and may be called shadowgraph pictures.

The objects, however, need not be entirely opaque so that if it is desired some light may be permitted to pass through and be indicated on the picture. The object may be more opaque in some parts than in others as in the case of an object painted on glass or other transparent surface.

It has been my object to not only simplify the work to be done in building up the successive designs to be photographed separately to show the successive movements or changes which are to appear as succeeding views on the finished strip, but also to simplify the means for making the changes and taking the pictures. To this end I have found it advantageous to make the successive arrangements and take the successive pictures on the strip in an order which is the reverse of that in which the pictures are to appear on the screen when projected. In other words, I take a picture of the final view as it will appear on the screen first and then take in reverse order the different views leading up to that final view. The novel features of the invention will be apparent from the following description taken in connection with the drawings.

In the drawings,

Figure 1 is a side elevation of an apparatus embodying one form of mechanism which I use;

Fig. 2 is a vertical section through the apparatus; and Fig. 3 is a horizontal section on the line 3—3 of Fig. 2, the cover of the box being broken away to show lines therein.

It will be understood that the broad features of my invention may be embodied in various forms of devices, but the camera for taking the pictures is preferably arranged vertically with its lens pointing down. It will be understood, however, that the invention is not limited to this arrangement of the camera and that the parts may be in other positions. In the particular form shown I make use of a frame 11 mounted on a box 12 the frame being made up of four corner posts and a camera 13 is arranged within the frame and is preferably adjustable vertically therein. The camera is mounted in a frame 14 which has projections fitting in vertical grooves in the corner posts so as to permit the movement of the camera up and down so as to bring it in proper position for focusing. The box 12 has in its top an opening in line with the lens 15 of the camera and that opening is closed by a transparent or translucent plate 16 which may be made of glass and which is easily removable. In taking pictures the camera will be focused on this plate and the objects to appear in the picture will be placed on the plate.

Within the box 12 I place suitable reflecting material 17 which may be white cardboard or any other surface which will be a good reflector of light. This reflector is preferably placed at an angle of 45° below the opening in the top of the box 12 so that it will constitute the background for any picture of an object on the plate 16. Within the box 12, but not within view from the lens of the camera I place the lamps or other suitable illuminating means 18 and as shown in the drawing they consist of incandescent electric lights. The top of the box 12 at 19 may be made removable so as to give access to the interior. It will be observed that the light from these lamps striking the reflector will be directed out through the plate 16 toward the camera. The camera which I use is of the ordinary moving picture type and it includes a shaft 20 which when rotated by the usual operating handle, will take a number of pictures at each revolution of the handle. It also includes a trick shaft 21 which is commonly used in moving picture machines in order to take a single picture on a single revolution of the handle the shutter for taking the picture being opened and closed during that revolution and the photographic film being fed forward a sufficient distance to take one picture. The frame 11 being in some instances rather tall and it being inconvenient for the operator standing down by the box 12 to reach the camera to turn the handle, I find it convenient in some instances to make use of an operating means provided with a handle 22 down next to the box and a flexible driving connection 23 leading up to the trick shaft. It will be understood that any suitable connection between the driving means down near the operator and the camera may be used and this feature is employed simply for convenience. The frame 11 may be provided with a shelf 24 at one side so that the operator may have a place to stand if he wishes to reach the camera itself.

It will be understood that if an object is painted on the glass 16 and the photograph is taken of it from the camera above the light reflected from the surface 17 will make the picture appear in outline and it will appear opaque if it is so painted. Furthermore, any objects placed on the plate 16 such as a piece of paper cut out to the desired shape will appear in the picture as solid black having the outline of the piece of paper.

To illustrate and give a clear idea of the operation of the device according to my method I will describe one particular way in which the device may be used, but it will be understood that the invention is not so limited. If it is desired to make a series of pictures which will attract and interest the observer and which will lead up to a final picture calling attention to Nunnally's chocolates I first place on the plate 16, letters which will spell out those words arranging them in the proper position for that purpose. Those letters may be painted on the plate in colors or with any other decoration, or may be simply cut out of paper. A sufficient number of photographs are then taken by the camera of these words to make them stay on the screen long enough to enable every one in the audience to read them and have them impressed on their mind. The last letter of the words is then removed from the glass and a small heart is placed in its position. A single picture is then taken and then the next letter is removed and another heart substituted and another picture is taken, this being continued until all of the letters have changed to hearts. The small hearts are then moved to some other position and a picture is taken and they will be successively moved to various positions making regular lines or fantastic lines or arranged in any way to suit the fancy of the operator, the handle of the camera being turned once so as to take a single picture after each change or each arrangement. The hearts can then be removed and irregular shaped pieces of paper substituted and those pieces of paper may be moved over the glass taking a picture of each successive arrangement. They are finally brought together and then a large heart is substituted for all of them. In the same way a representation of Cupid with a bow and quiver of arrows may be made to appear on the glass and it may be made to appear that he shoots an arrow at the large heart and breaks it into small particles, it being understood that the successive rearrangements are in the reverse order of the final result when projected on the screen. For ordinary advertising purposes the pictures may be taken as direct photographs and not in the form of a negative since this will be simpler and easier where only one copy is desired. Where more than one copy is desired the pictures may be transferred as negatives and copies subsequently printed.

The taking of the pictures in the reverse order has a number of advantages and it simplifies considerably the work. The artist in the first place arranges his final result on the plate either by painting or by other means and he can make sure that it is as perfect as it is considered necessary before he commences to take the pictures and thereafter he will simply erase or take away parts of the built up design and will substitute others. It has been found that it is much easier to do this and it can be done much more quickly than if the attempt is made to gradually build up the final result. Furthermore, in using a device like that shown the interior of the box becomes heated by reason of the lamps 18 and the plate 16 gets hot after it has been used for some time in taking pictures. By starting the work of taking the pictures with the final picture that picture will be in good shape and will not be endangered or affected by the heat during the short time necessary to take it, whereas, if it was necessary to place that picture on the hot glass the result would not be satisfactory and considerable time would be wasted in waiting for the glass to cool. I find it particularly advantageous to arrange the plate 16 in a horizontal position with the camera directed down toward it so that the objects can be simply placed on the plate and will remain in position, but it will be understood, of course, that my method may be employed where the plate is not horizontal and it will be furthermore understood that some of the features of my invention are not limited to the use of a reflecting background, but the method may be employed in making pictures of objects placed on an opaque plate in the position of plate 16. The light in that instance will not be behind the plate, but will be on the same side as the camera whether that camera is vertical or horizontal.

Having thus described my invention what I claim is:—

1. The combination with a camera facing in a downward direction, of a translucent or transparent plate extending in a substantially horizontal direction and adapted to support on its surface objects to be photographed the said plate being in line with said camera and on which it is adapted to be focused, a source of light, means for uniformly diffusing and directing rays of light through said plate toward said camera, the camera being of the moving picture type for taking in rapid succession a series of pictures and being provided with a trick operating shaft adapting it to the taking of a single picture when desired.

2. In a device of the class described for making shadowgraph pictures, the combination with a camera, of an extended translucent support on which the objects to be photographed may be arranged in different positions, means for focusing the camera on said support, and means for directing uniformly diffused rays of light through said support past said objects toward said camera.

3. In a device of the class described for making shadowgraph pictures, the combination of a camera directed downward, of a translucent extended supporting plate on which the camera is focused and which is adapted to support objects to be photographed on any part of its surface in different positions, and means for uniformly illuminating the space beneath said plate whereby light will be uniformly diffused through said plate from beneath.

4. The combination with a camera facing in a downward direction, of a translucent or transparent exposed and accessible plate extending in a substantially horizontal direction and adapted to support and maintain in position by gravity on its surface a number of objects to be photographed, the said plate being in line with said camera and on which it is adapted to be focused, a source of light, and means for uniformly diffusing and directing rays of light from said source through said plate toward said camera.

5. The method of making a photographic strip of trick pictures in proper related succession to produce when projected in succession on a screen the illusion of moving and changing objects which consists in arranging the objects to be photographed on an extended translucent support on which they rest and maintain their position by gravity, projecting light through said support past said objects toward the photographic means while taking one or more pictures, making a related succession of changes in said objects on said support, and taking one or more pictures after each selected change or rearrangement.

6. The method of making a photographic strip of trick pictures in proper related succession to produce when projected in succession on a screen the illusion of moving and changing objects which consists in arranging the objects to be photographed on a translucent surface which will support them in position by gravity in the form which it is desired to show in the last view of the projected pictures projecting uniformly diffused light through said surface past said objects, taking one or more pictures of the objects so arranged, making a series of changes in said objects in the reverse order from that desired to be exhibited when the pictures are projected, and taking one or more pictures after each selected rearrangement or change.

In testimony whereof I affix my signature in presence of two witnesses.

CARL B. ROWNTREE.

Witnesses:
H. S. ROWLAND,
VERNON L. WALKER.